United States Patent
Zou et al.

(10) Patent No.: US 12,052,714 B2
(45) Date of Patent: Jul. 30, 2024

(54) SYSTEM AND METHODS FOR CONFIGURING USER EQUIPMENTS WITH OVERLAPPING PUCCH RESOURCES FOR TRANSMITTING SCHEDULING REQUESTS

(71) Applicant: TELEFONAKTIEBOLAGET LM ERICSSON (PUBL), Stockholm (SE)

(72) Inventors: Zhenhua Zou, Solna (SE); Kittipong Kittichokechai, Järfälla (SE); Gustav Wikström, Täby (SE); Mårten Sundberg, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 296 days.

(21) Appl. No.: 16/621,970

(22) PCT Filed: Jun. 15, 2018

(86) PCT No.: PCT/IB2018/054441
§ 371 (c)(1),
(2) Date: Dec. 12, 2019

(87) PCT Pub. No.: WO2018/229731
PCT Pub. Date: Dec. 20, 2018

(65) Prior Publication Data
US 2020/0229177 A1    Jul. 16, 2020

Related U.S. Application Data

(60) Provisional application No. 62/521,183, filed on Jun. 16, 2017.

(51) Int. Cl.
*H04W 72/21* (2023.01)
*H04L 5/00* (2006.01)
(Continued)

(52) U.S. Cl.
CPC .............. *H04W 72/21* (2023.01); *H04L 5/001* (2013.01); *H04L 5/0053* (2013.01); *H04W 72/0446* (2013.01); *H04W 72/1268* (2013.01)

(58) Field of Classification Search
CPC ..... H04L 5/001; H04L 5/0053; H04L 5/0094; H04W 72/0413; H04W 72/042;
(Continued)

(56) References Cited

U.S. PATENT DOCUMENTS 9,955,356 B2 * 4/2018 Xiong ....................... H04L 1/16
2012/0039278 A1   2/2012 Park
(Continued)

FOREIGN PATENT DOCUMENTS

CN    105490784 A    4/2016
CN    106664520 B    8/2020
(Continued)

OTHER PUBLICATIONS

NTT et al. "Status Report to TSG", RP-171137.zip -> RP-171137 SR on NR-WID.doc, Last Saved Date: Mon, May 29, 2017, https://isearch.3gpp.org/isysquery/602a8dde-4cc1-4986-a883-5604c40e1817/11-17/list/, Total pp. 239 (Year: 2017).*
(Continued)

*Primary Examiner* — Shah M Rahman
(74) *Attorney, Agent, or Firm* — Ericsson Inc.

(57) ABSTRACT

Systems and methods for configuring UEs with overlapping PUCCH resources for transmitting scheduling requests are provided. A network node can transmit a scheduling request configuration message indicating PUCCH resources, including a periodicity parameter being less than the PUCCH length. A wireless device can configure PUCCH resources in accordance with the configuration message and transmit a scheduling request.

28 Claims, 13 Drawing Sheets

(51) Int. Cl.
*H04W 72/0446* (2023.01)
*H04W 72/1268* (2023.01)

(58) Field of Classification Search
CPC ......... H04W 72/0446; H04W 72/1268; H04W 72/1284; H04W 72/0406; H04W 72/21; H04W 72/23; H04W 72/20
See application file for complete search history.

(56) References Cited

U.S. PATENT DOCUMENTS

| | | | | |
|---|---|---|---|---|
| 2013/0121258 | A1* | 5/2013 | Mukherjee | H04W 74/004 370/329 |
| 2014/0050185 | A1 | 2/2014 | Hooli et al. | |
| 2016/0014753 | A1* | 1/2016 | Wu | H04B 7/022 370/280 |
| 2016/0073394 | A1 | 3/2016 | Kim et al. | |
| 2016/0095105 | A1* | 3/2016 | Chen | H04L 5/0053 370/329 |
| 2016/0226639 | A1* | 8/2016 | Xiong | H04L 1/08 |
| 2017/0202009 | A1* | 7/2017 | Kim | H04W 72/21 |
| 2017/0366311 | A1* | 12/2017 | Iyer | H04L 5/0007 |
| 2017/0374658 | A1* | 12/2017 | Kim | H04L 5/0048 |
| 2018/0124815 | A1* | 5/2018 | Papasakellariou | H04L 5/0053 |
| 2018/0139773 | A1* | 5/2018 | Ma | H04L 5/0042 |
| 2018/0227949 | A1* | 8/2018 | Tiirola | H04W 74/04 |
| 2018/0324787 | A1* | 11/2018 | Yin | H04L 1/1861 |
| 2018/0343682 | A1* | 11/2018 | Tang | H04L 41/08 |
| 2018/0368161 | A1* | 12/2018 | Tiirola | H04L 5/0082 |
| 2019/0028877 | A1* | 1/2019 | Loehr | H04W 72/1268 |
| 2019/0246416 | A1* | 8/2019 | Park | H04W 72/1278 |
| 2019/0349923 | A1* | 11/2019 | Shao | H04W 72/04 |
| 2019/0394757 | A1* | 12/2019 | Zhang | H04W 72/04 |
| 2020/0022133 | A1* | 1/2020 | Yamamoto | H04W 52/281 |
| 2020/0196327 | A1* | 6/2020 | Zhang | H04W 28/0268 |
| 2020/0196343 | A1* | 6/2020 | Marinier | H04W 72/1289 |

FOREIGN PATENT DOCUMENTS

| | | |
|---|---|---|
| EP | 3051733 A1 | 8/2016 |
| RU | 2562455 C2 | 9/2015 |
| WO | 2011139068 A2 | 11/2011 |
| WO | WO-2013071390 A1 * | 5/2013 ......... H04W 74/002 |
| WO | 2016/048522 A1 | 3/2016 |
| WO | 2016071010 A1 | 5/2016 |
| WO | 2016/093573 A1 | 6/2016 |
| WO | 2017/048215 A1 | 3/2017 |
| WO | 2018231728 A1 | 12/2018 |

OTHER PUBLICATIONS

Intel Corporation (R1-1707396), describing Time and frequency domain resource allocation for long PUCCH, 3GPP TSG RAN WG1 Meeting #89 R1-1707396, Hangzhou, P. R. China, May 15-19, 2017, Total pp. 5 (Year: 2017).*
Samsung (R1-1708011), describing Resource allocation for PUCCH with SR, 3GPP TSG RAN WG1 Meeting #89, R1-1708011, Hangzhou, China, May 15-19, 2017, Total pp. 4 (Year: 2017).*
Huawei et al.,"SR enhancements with multiple numerologies", 3GPP TSG-RAN2 Meeting #98, R2-1705625, Hangzhou, China, May 15-19, 2017.
Intel Corporation, "Resource allocation for scheduling request", 3GPP TSG RAN WG1 Meeting #89, R1-1707394, Hangzhou, P. R. China, May 15-19, 2017.
Nokia et al., "sPUCCH Design for shortened TTI", 3GPP TSG-RAN WG1 Meeting #86bis, R1-1609164, Lisbon, Portugal, Oct. 10-14, 2016.
Qualcomm Incorporated, "Channel Multiplexing for Long PUCCH", 3GPP TSG RAN WG1 Meeting #89, R1-1708619, Hangzhou, CN May 15-19, 2017.
ISR and Written Opinion from corresponding PCT Application PCT/IB2018/054441.
Intel Corporation: "Enhancements to SR targeting low latency requirements", R1-1707406, 3GPP TSG-RAN WG1 Meeting #89, Hangzhou P.R. China May 15-19, 2017, 6 pages.
Nokia et al: "Long PUCCH formats for small payloads", R1-1708513, GPP TSG-RAN WG1 Meeting #89, Hangzhou P.R. China May 15-19, 2017, 4 pages.
Nokia, et al. "Long PUCCH formats for NR", 3GPP TSG RAN WG1#88bis, R1-1705235, Spokane, U.S.A., Apr. 3-7, 2017.

* cited by examiner

SYSTEM AND METHODS FOR CONFIGURING USER EQUIPMENTS WITH OVERLAPPING PUCCH RESOURCES FOR TRANSMITTING SCHEDULING REQUESTS

CROSS REFERENCE TO RELATED APPLICATIONS

This application claims the benefit of U.S. Provisional Application No. 62/521,183 filed on Jun. 16, 2017, the entire contents of which are hereby incorporated by reference.

TECHNICAL FIELD

The present disclosure generally relates to wireless communications and wireless communication networks.

INTRODUCTION

The architecture for New Radio (NR) (also known as 5G or Next Generation) is being discussed in standardization bodies such as 3GPP. FIG. 1 illustrates an example of a wireless network 100 that can be used for wireless communications. Wireless network 100 includes user equipment UEs 102A-102B and a plurality of network nodes, such as radio access nodes 104A-104B (e.g. eNBs, gNBs, etc.) connected to one or more network nodes 106 (such as core network nodes) via an interconnecting network 115. The network 100 can use any suitable deployment scenarios. UEs 102 within coverage area 108 can each be capable of communicating directly with radio access node 104A over a wireless interface. In some embodiments, UEs 102 can also be capable of communicating with each other via D2D communication.

As an example, UE 102A can communicate with radio access node 104A over a wireless interface. That is, UE 102A can transmit wireless signals to and/or receive wireless signals from radio access node 104A. The wireless signals can contain voice traffic, data traffic, control signals, and/or any other suitable information. In some embodiments, an area of wireless signal coverage associated with a radio access node 104A can be referred to as a cell 108. 108 is the serving cell and 110 is another neighboring cell that also may allow for communication, but to which the UE 102A is not currently connected.

The interconnecting network 115 can refer to any interconnecting system capable of transmitting audio, video, signals, data, messages, etc., or any combination of the preceding. The interconnecting network 115 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 106 can be a core network node 106, managing the establishment of communication sessions and other various other functionalities for UEs 102. Examples of core network node 106 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 102 can exchange certain signals with the core network node using the non-access stratum layer. In non-access stratum signaling, signals between UEs 102 and the core network node 106 can be transparently passed through the radio access network. In some embodiments, radio access nodes 104 can interface with one or more network nodes over an internode interface.

NR wireless communication systems are envisaged to expand usage scenarios and applications with respect to the current mobile network generations. "Ultra-Reliable Low-Latency Communications" (URLLC) with strict latency and reliability requirement was agreed as one key scenario for NR. URLLC demands an ultra-high delivery reliability of 99.999% (five nines) or even higher, within a delivery latency bound as low as one millisecond.

The Physical Uplink Control Channel (PUCCH) can have different formats depending on lengths and payload sizes. According to discussions in the standardization bodies, there can be short PUCCH formats with 1 to 2-symbol length and long PUCCH formats with more than 2 symbols length (e.g. 4-14 symbols in length).

For 2-symbol short PUCCH, it was agreed to base the design on a copy/repetition of one-symbol PUCCH with frequency hopping. On the structure of long PUCCH formats, it was agreed to base the design of long PUCCH for 1-2 UCI bits on PUCCH Format 1/1a/1b in LTE to enable high multiplexing capacity. It is noted that LTE supports PUCCH Format 1/1a/1b for payload sizes 1 and 2 bits which enables multiplexing of up to 36 users. However, multiplexing of 36 PUCCH Format 1/1a/1b transmissions onto the same time-frequency resource is in practice often limited by interference and hence the realistic multiplexing capacity is expected to be reduced.

Based on the LTE PUCCH Format 1/1a/1b which relies on time-domain block spreading across DFTS-OFDM symbols, long PUCCH for 1-2 bits in NR has the following structure:

Frequency hopping is supported.

The Demodulated Reference Symbol(s) (DMRS) are formed as the following: DMRS for a PUCCH is a cyclic shift of a base DMRS sequence. Time-domain orthogonal cover code (OCC) is used for DMRS symbols per hop when applicable.

The data symbols are formed as the following: The modulated UCI bit(s) is multiplied to a cyclic shift of a base sequence. Time-domain OCC is used for data symbols per hop when applicable.

FIG. 2 illustrates an example of the long PUCCH structure. Note that different DMRS symbol patterns per hop are possible. FIG. 2 shows an example of the 4 and 7-symbol long PUCCH structure for 1-2 UCI bits where a fixed position in time domain is used for the DMRS symbols, e.g. every other symbol starting with the first symbol in the slot. For illustration purpose, the position of PUCCH in a 14-symbol long slot is also assumed to be at the end of the slot.

For the UE to indicate to the network that it has data in its buffer and wants to be scheduled for uplink (UL) transmission, it can transmit to the network a "Scheduling Request" (SR). The SR is defined as a specific PUCCH format, and is defined so that multiple UEs can transmit SRs simultaneously, and hence simultaneously indicate that they want to be scheduled to the network, using the same resources.

However, it may happen that the network side fails to detect a SR, which can occur when the UE is experiencing poor coverage conditions or when its transmission is masked by an interfering transmission of a strong UE that is in a neighboring cell. According to URLLC target put forth by 3GPP TR 38.913, a packet should be delivered with BLER 10-5 within a one-way latency bound of 1 ms. It is therefore important that SR should be transmitted with sufficient high reliability from start.

Another aspect is the periodicity by which a SR can be sent to the network. Assume for example that the SR is configured with a periodicity of 5 ms, and assume the current LTE TTI of 1 ms, then a UE can only request UL resources in every fifth transmission opportunity, leading to an implicit delay of at most 5 ms in the worst-case timing between packet arrival at the UE buffer and the transmission of the SR. The time to wait until the detection introduces extra delay, which in turn can induce undesired latency for UL data.

SUMMARY

It is an object of the present disclosure to obviate or mitigate at least one disadvantage of the prior art.

In some aspects of the present disclosure, there is provided systems and methods for configuring UEs with overlapping PUCCH resources for transmitting scheduling requests.

In a first aspect, there is provided a method for scheduling request resource allocation, performed by a network node. The method comprises allocating Physical Uplink Control Channel (PUCCH) resources to at least one wireless device for uplink transmissions. A configuration message is transmitted, to a first wireless device, indicating PUCCH resources for transmitting scheduling requests. The configuration message includes a PUCCH length and a periodicity, wherein the periodicity is smaller than the PUCCH length. A first scheduling request is received from the first wireless device.

In another aspect, there is provided a network node comprising circuitry including a processor and a memory. The memory contains instructions executable by the processor whereby the network node is operative to allocate Physical Uplink Control Channel (PUCCH) resources to at least one wireless device for uplink transmissions. The network node transmits, to a first wireless device, a configuration message indicating PUCCH resources for transmitting scheduling requests, the configuration message including a PUCCH length and a periodicity, wherein the periodicity is smaller than the PUCCH length. The network nodes receive, from the first wireless device, a first scheduling request.

In another aspect, there is provided a method for scheduling request resource configuration, performed by a wireless device. The method comprising receiving a configuration message indicating Physical Uplink Control Channel (PUCCH) resources for transmitting scheduling requests. The configuration message includes a PUCCH length and a periodicity, wherein the periodicity is smaller than the PUCCH length. PUCCH resources of the wireless device are configured in accordance with the configuration message. A scheduling request is transmitted using the configured PUCCH resources.

In another aspect, there is provided a wireless device comprising circuitry including a processor and a memory. The memory contains instructions executable by the processor whereby the wireless device is operative to receive a configuration message indicating Physical Uplink Control Channel (PUCCH) resources for transmitting scheduling requests, the configuration message including a PUCCH length and a periodicity, wherein the periodicity is smaller than the PUCCH length. The wireless device configures PUCCH resources of the wireless device in accordance with the configuration message. The wireless device transmits a scheduling request using the configured PUCCH resources.

In some embodiments, the PUCCH length can indicate a number of symbols to be used for transmitting scheduling requests. In some embodiments, the PUCCH length cane be a long PUCCH format of four or more symbols. The periodicity is less than or equal to three symbols.

In some embodiments, the configuration message can further include at least one frequency resource for transmitting scheduling requests. The configuration message can further include frequency shifting information.

In some embodiments, the configuration message can further include a starting periodicity defining a time that a PUCCH transmission can be initiated.

In some embodiments, the network node can transmit a second configuration message to a second wireless device. In some embodiments, the network node can receive a second scheduling request from a second wireless device, wherein the first and second scheduling requests are overlapping in at least one of time and frequency resources.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
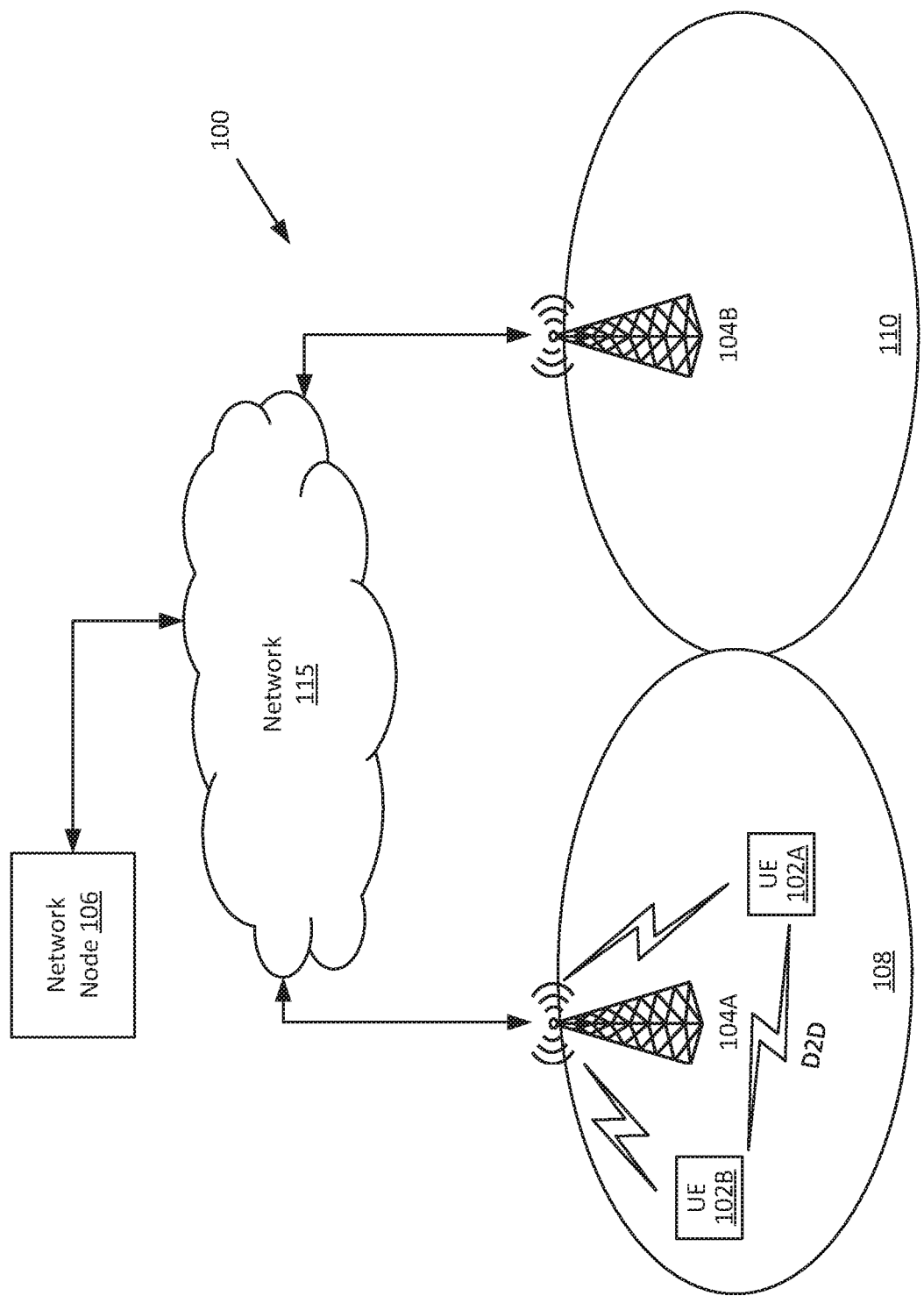
FIG. 1 illustrates an example wireless network.
Figure 2:
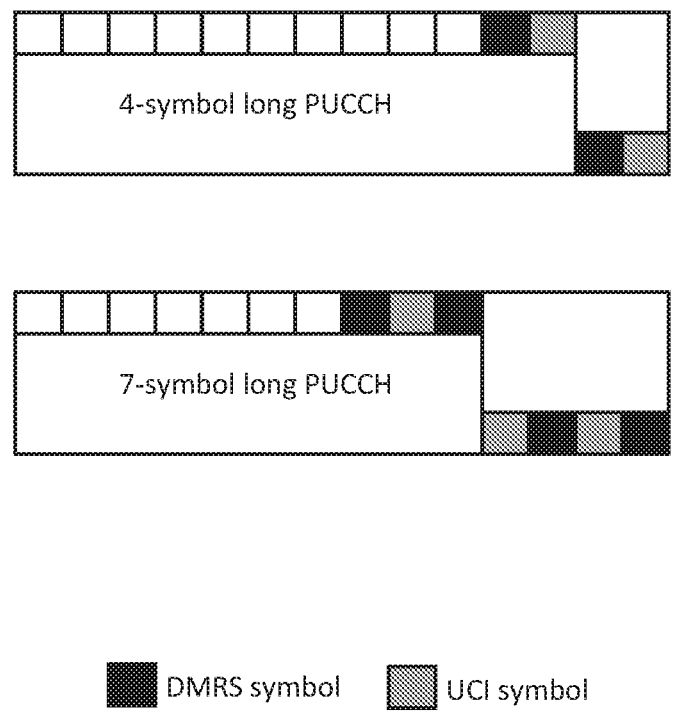
FIG. 2 illustrates an example of a long PUCCH structure.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 12.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 14.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a UE or a network node.

In some embodiments, a UE can be configured to operate in carrier aggregation (CA) implying aggregation of two or more carriers in at least one of DL and UL directions. With CA, a UE can have multiple serving cells, wherein the term "serving" herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different TPs of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

As discussed, the short PUCCH format is beneficial in terms of low latency processing. However, to have a highly reliable SR transmission, a long PUCCH format with longer than 2 symbols, for example four symbol long PUCCH, may be needed. Conventionally, this can lead to an alignment latency as the SR periodicity cannot be lower than the duration of the long PUCCH. One solution to this potential problem is to allocate multiple long PUCCH resources in different frequency resources, i.e., frequency multiplexing. However, this may not be resource efficient.

Figure 3:
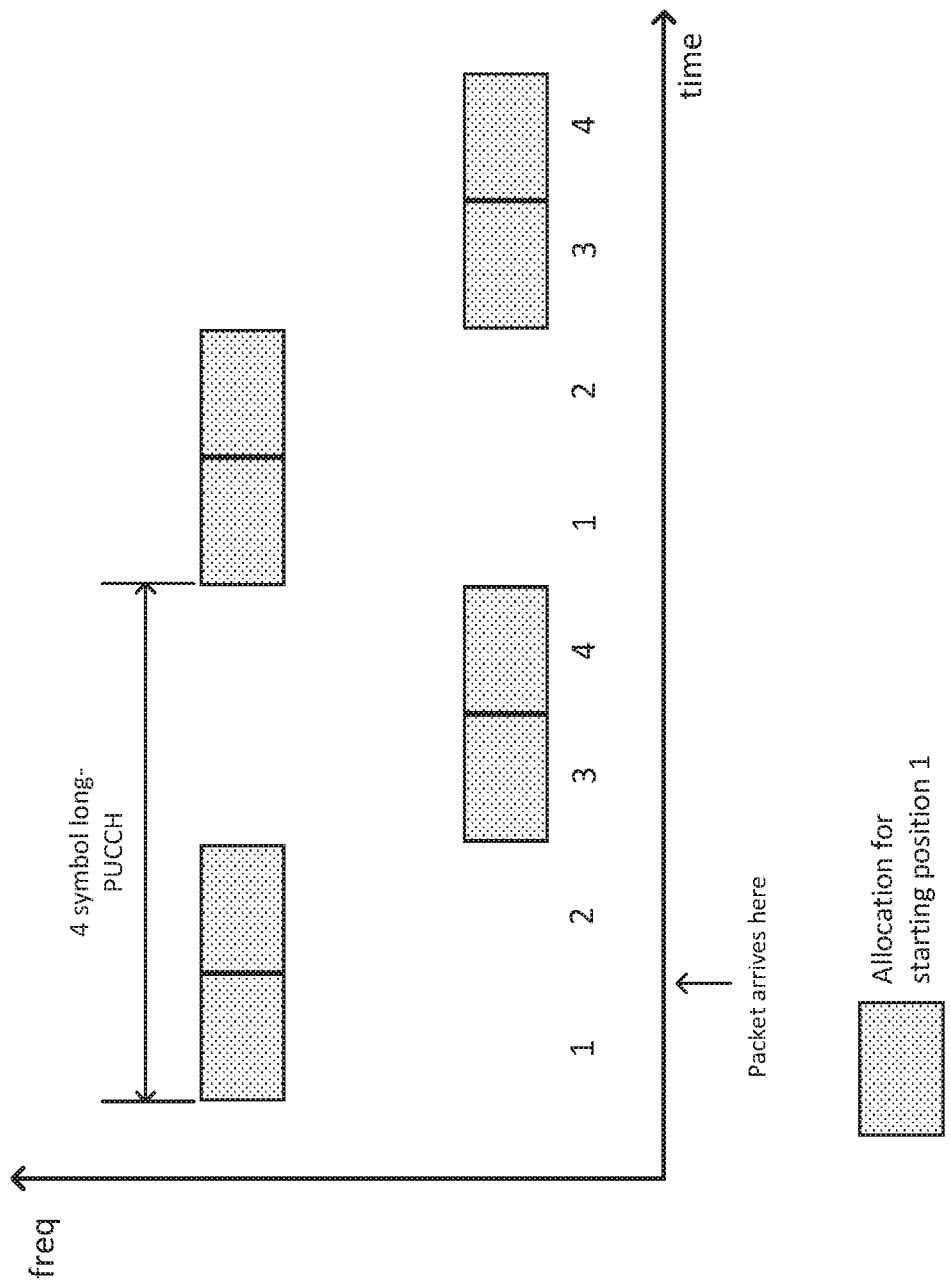
FIG. 3 illustrates an example of a long PUCCH allocation.

FIG. 3 illustrates an example of a long PUCCH format allocation. In this example, the PUCCH length is 4 symbols and the periodicity is also 4 symbols. This PUCCH format also uses frequency hopping, e.g. a first frequency is used for symbols 1 and 2, a second frequency is used for symbols 3 and 4. In this example, if a packet arrives for transmission after the first symbol position, the UE must wait until the start of the next 4-symbol PUCCH to transmit a SR.

Some embodiments of the present disclosure include allocating overlapping PUCCH resources for a UE to send a SR such that more frequent and highly reliable SR resources can be configured.

It will be appreciated that some of the non-limiting examples described herein will be illustrated using a 4-symbol long PUCCH format, however, they can be generally applied to any length of PUCCH format. As discussed, current standard releases support PUCCH format 0 (PUCCH length of 1-2 symbols) and PUCCH format 1 (PUCCH length of 4-14 symbols), but any supported symbol length can be considered.

The network configures a UE with PUCCH resources for SR and/or HARQ feedback. The baseline configuration includes a PUCCH pattern (length, frequency resources) and a periodicity (P). In addition, the network can also configure: a starting periodicity to indicate at what times T the PUCCH pattern can be initiated, and a frequency hopping flag to indicate which frequency resource the PUCCH pattern shall be initiated on. As an example, 0 can indicates always the same frequency resource, and 1 can indicate shifting resource depending on starting times T in relation to periodicity P.

For example, a configuration message such as the SchedulingRequestResourceConfig information element can determine physical layer resources on PUCCH where the UE may send a scheduling request. The configuration message can include parameters such as SR periodicity, SR-Offset and/or periodicityAndOffset to provide the UE with the appropriate PUCCH configuration. The periodicity and/or offset values can be given in a number of symbols or number of slots.

Figure 4:
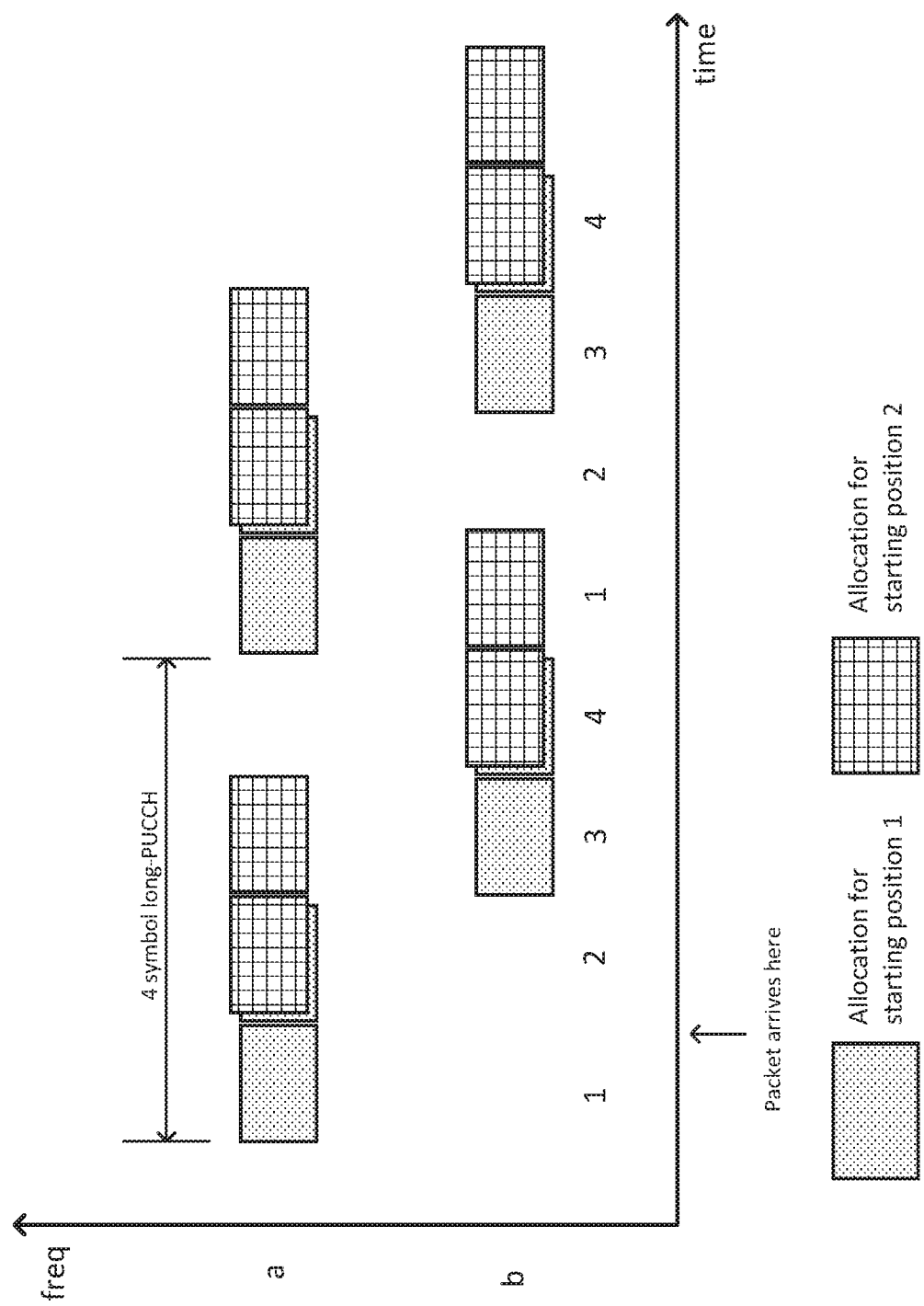
FIG. 4 illustrates a first example embodiment of overlapping PUCCH allocation.

FIG. 4 illustrates a first embodiment, where the overlapping PUCCH allocations follow the same time-frequency shifting/hopping order, i.e., the first two consecutive symbols are transmitted on frequency band "a" and the last two consecutive symbols shift to a different frequency band "b". The shift can be configured to be any number of OFDM symbols. In this example, the PUCCH length is 4 symbols and the periodicity is 1 symbol (e.g. the second allocation is 1 symbol later, at starting position 2). Accordingly, with this PUCCH allocation, a UE has the opportunity to transmit a SR beginning at both position 1 and/or position 2.

In this example, if a packet arrives for transmission after the first symbol position, the UE can transmit a SR at position 2 as opposed to waiting until the time of the next position 1. A benefit of this embodiment is that the SR can be allocated every K OFDM symbols, where K is any integer value larger than or equal to one.

Figure 5:
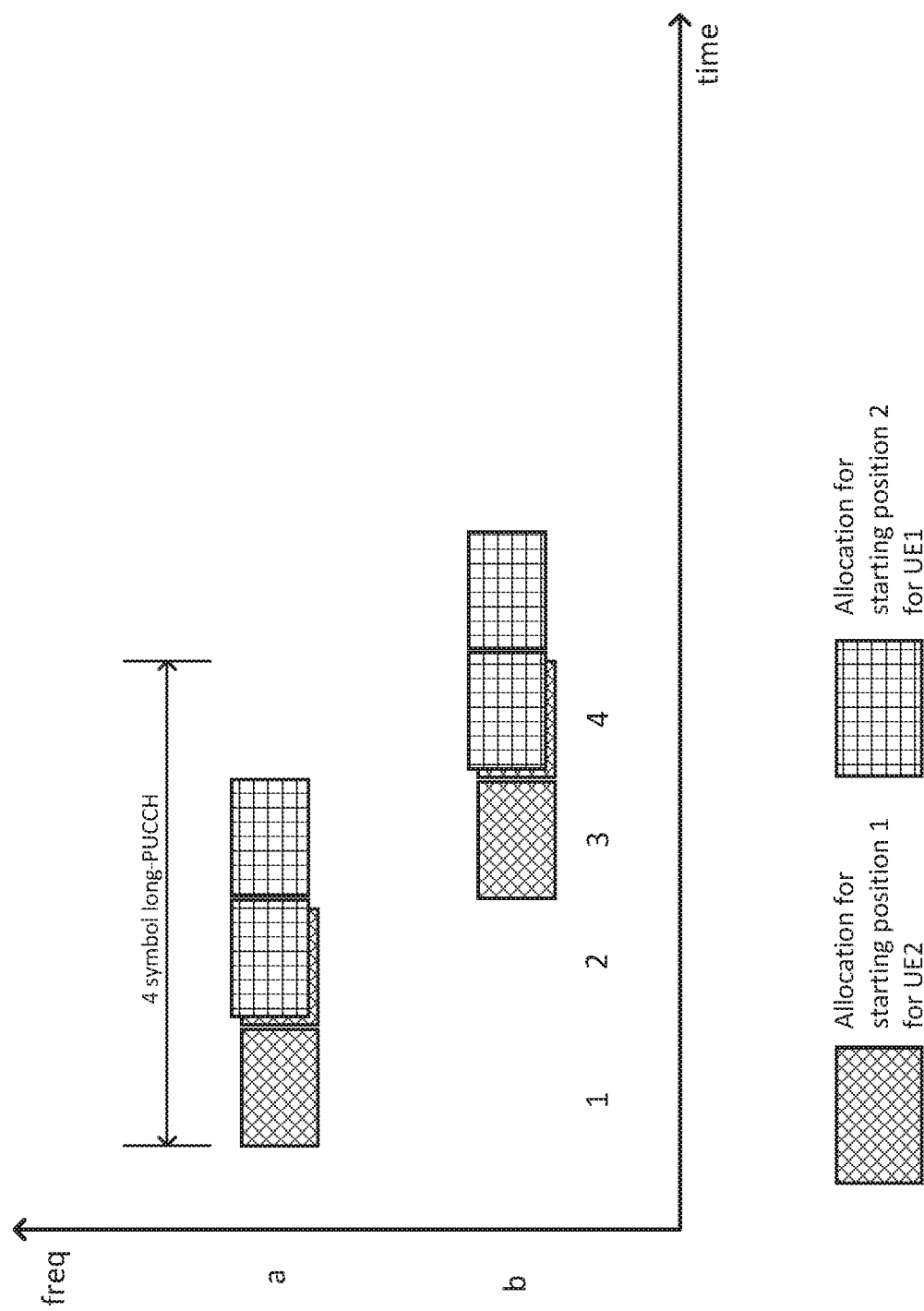
FIG. 5 illustrates an example of receiving overlapping PUCCH transmissions.

According to the embodiment of FIG. 4, a first UE can send a SR with PUCCH at position 2. However, a second UE may have a long PUCCH format allocated with starting position 1. FIG. 5 illustrates an example, from the perspective of an access node, of receiving overlapping SR transmissions from two UEs. The first UE, for example from FIG. 4, transmits a SR starting at position 2 that results in an overlap with the allocation that starts at position 1 for a second UE.

The first embodiment relies on the orthogonality between a shifted long PUCCH of the first UE and a non-shifted long PUCCH of the second UE being maintained because a different cyclic shift is applied to each OFDM symbol (both DMRS and modulated UCI) in a 4-symbol long PUCCH. This also holds for different DMRS symbol patterns per hop.

In the case that time-domain OCC is also applied on UCI and DMRS symbols, multiplexing capacity may be affected depending on the shift size. There are two main cases: 1) If the SR opportunity period aligns with the frequency hopping boundary in PUCCH (e.g. a SR opportunity at every 2 symbols for the 4-symbol long PUCCH), then multiplexing capacity is not affected. 2) If the SR opportunity period does not align with the frequency hopping boundary (as in the example of FIG. 4), OCC can be affected and multiplexing capacity may be reduced.

Figure 6:
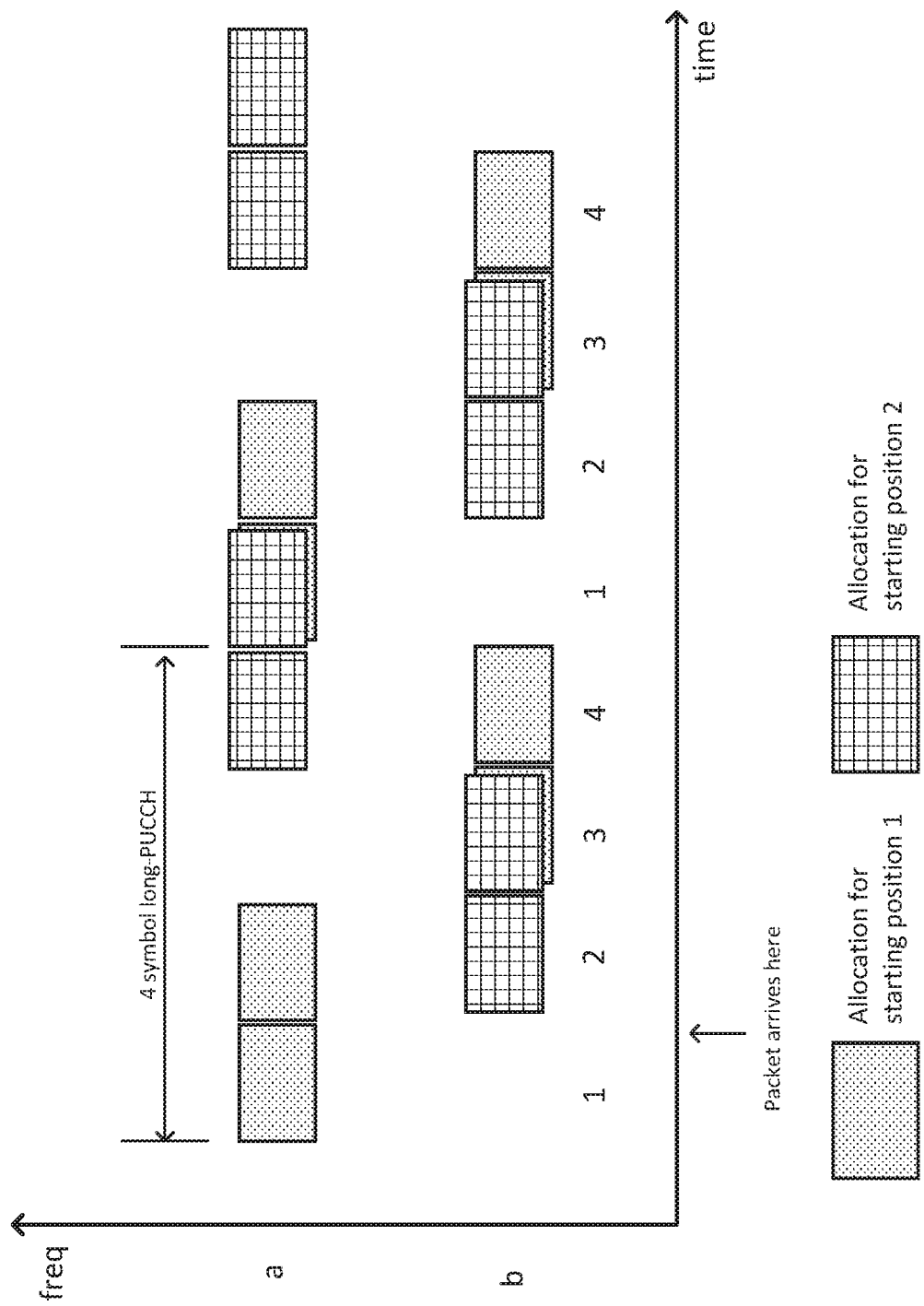
FIG. 6 illustrates a second example embodiment of overlapping PUCCH allocation.

FIG. 6 illustrates a second embodiment of overlapping PUCCH allocation. The example of FIG. 6 is a variation of the first embodiment where the frequency hopping structure in the PUCCH can also be modified. In this case, the PUCCH that has allocation for starting position 1 starts at frequency "a" and the PUCCH that has allocation for starting position 2 starts at another frequency, frequency "b".

Figure 7:
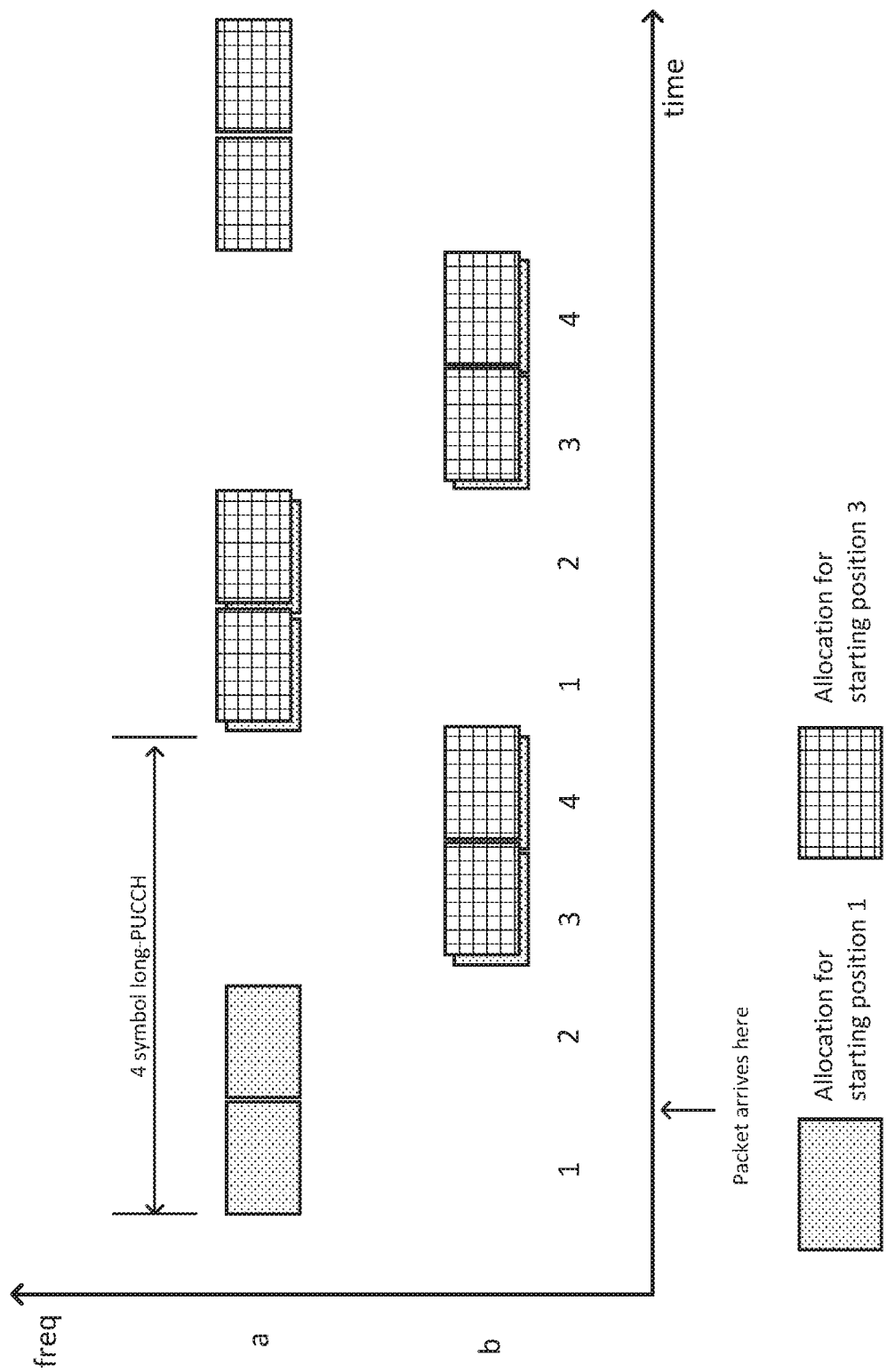
FIG. 7 illustrates a third example embodiment of overlapping PUCCH allocation.

FIG. 7 illustrates a third embodiment of overlapping PUCCH allocation. The example of FIG. 7 is a variation of the first embodiment where the periodicity is 2 symbols (e.g. the second allocation is 2 symbols later, at starting position 3). In this example, the overlapping PUCCH allocation follows the same absolute time-frequency allocation as in the original PUCCH format shown in FIG. 3.

In the third embodiment, there are time-frequency resources that are not affected by this shifted long-PUCCH allocations, and thus can be more resource efficient compared to the first embodiment, as the free resources can be used for other transmission. Moreover, it does not suffer from the loss of orthogonality from the OCC if applied.

However, due to the reasons of DMRS location and coherent combing, the first two consecutive OFDM symbols must be together in the same frequency band. Therefore, the shift in this example should be multiple(s) of two OFDM symbols. The shortest SR period is two OFDM symbols and, hence, can be considered worse than the first embodiment in terms of alignment delay.

As a generalization, for long PUCCH with X symbol-long length and frequency hopping at the x_1th symbol, the alignment delay (i.e. SR period) is between x_1 symbols and X-x_1 symbols.

Figure 8:
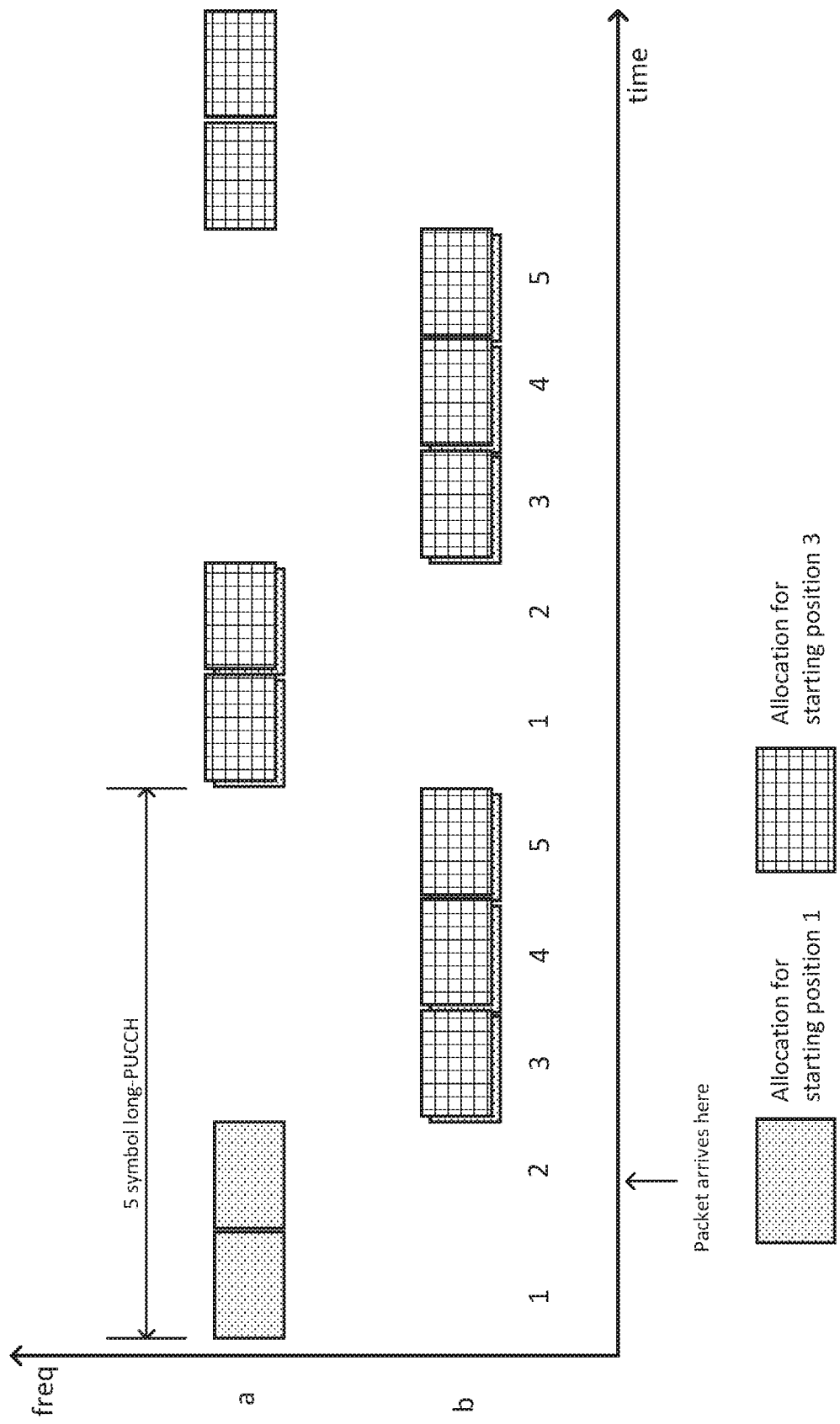
FIG. 8 illustrates a fourth example embodiment of overlapping PUCCH allocation.

FIG. 8 illustrates a fourth embodiment of overlapping PUCCH allocation, including a 5-symbol long PUCCH where the starting position allocation is at positions 1, 3, 6, 8, 11. The periodicity and frequency hopping in this example is similar to that of FIG. 7.

Accordingly, the orthogonality of the long PUCCH format is not lost if they are partially overlapped. A partial overlapping long PUCCH resources for UE to send SR is allocated so that more frequent SR can be allocated without sacrificing reliability.

Figure 9:
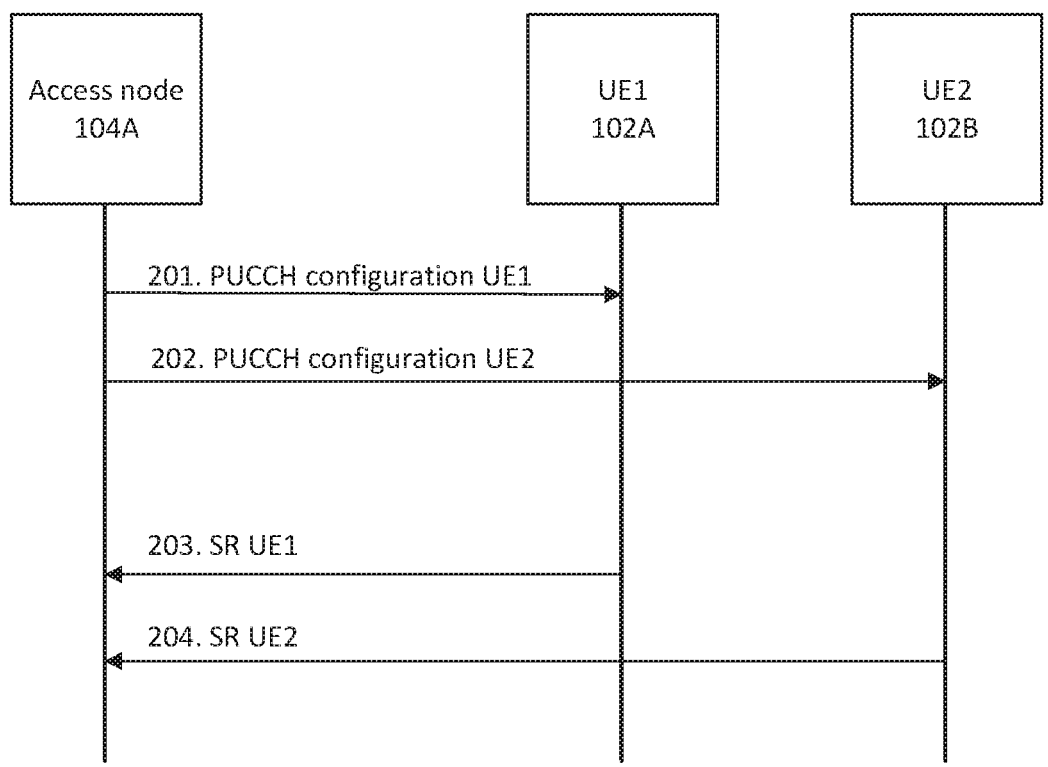
FIG. 9 is an example signaling diagram.

FIG. 9 is an example signaling diagram according to embodiments of the present disclosure. Access node 104A transmits SR configuration messages to UE1 102A and UE2 102B (steps 201, 202) to configure the UEs with PUCCH resources for SR and/or HARQ feedback. The configuration message(s) 201/202 can include one or more parameters indicating PUCCH pattern (length, frequency resources), PUCCH periodicity, allocation for starting position, and/or frequency hopping flag, etc. as have been discussed herein. Access node 104A can allocate resources to configure the UEs 102A and 102B to transmit SRs that are overlapping in time and/or frequency resources.

Access node 104A receives at least one SR message 203 from UE1 102A. Access node 104A receives at least one SR message 204 from UE2 102B. The received SR messages 203/204 can be overlapping or partially overlapping. The received SR messages 203/204 can be long PUCCH format. Access node 104A can decode the received SR messages 203/204.

It will be appreciated that one or more of the above steps can be performed simultaneously and/or in a different order.

Figure 10:
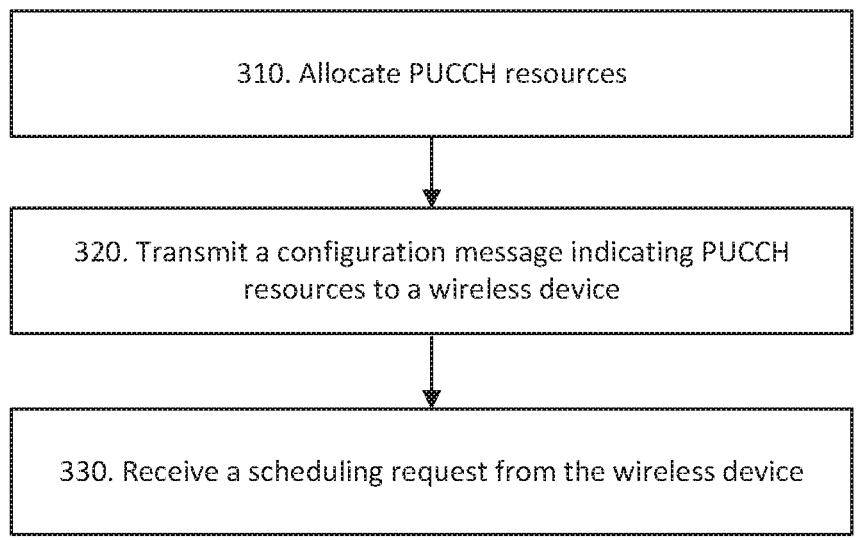
FIG. 10 is a flow chart illustrating a method which can be performed in a network node.

FIG. 10 is a flow chart illustrating a method which can be performed in a network node, such as access node 104. The method can include:

Step 310: Allocate PUCCH resources to at least one wireless device for uplink transmissions.

Step 320: Transmit a configuration message indicating PUCCH resources for transmitting scheduling requests to a first wireless device, such as UE 102. The configuration message can comprise parameters including at least a PUCCH length and a periodicity. The periodicity can be smaller than the PUCCH length. The PUCCH length can indicate a number of (OFDM) symbols to be used for transmitting scheduling requests. The periodicity can indicate a number of symbols at which the next SR opportunity is allocated. In some embodiments, the PUCCH length can be a long PUCCH format of four or more symbols and, accordingly, the periodicity can be less than or equal to three symbols.

In some embodiments, the configuration message can further include parameter(s) indicating frequency resource(s) for transmitting scheduling requests. The configuration message can further include frequency shifting/hopping information.

Step 330: Receive a first scheduling request from the first wireless device. The scheduling request can be received over the allocated PUCCH resources.

In some embodiments, a second configuration message can be transmitted to a second wireless device. A second scheduling request can be subsequently received from the second wireless device, wherein the first and second scheduling requests are overlapping in at least one of time and frequency resources.

It will be appreciated that one or more of the above steps can be performed simultaneously and/or in a different order. Also, steps illustrated in dashed lines are optional and can be omitted in some embodiments.

Figure 11:
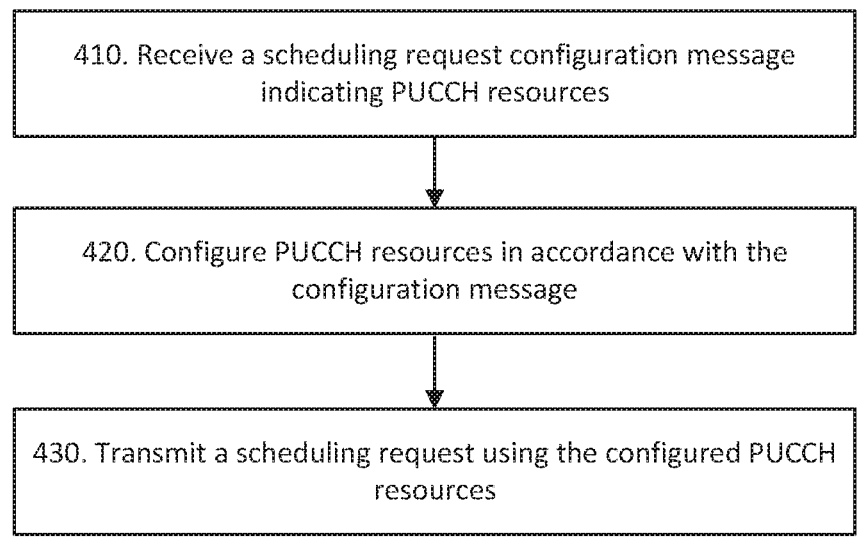
FIG. 11 is a flow chart illustrating a method which can be performed in a wireless device.

FIG. 11 is a flow chart illustrating a method which can be performed in a wireless device, such as UE 102. The method can include:

Step 410: Receive a configuration message indicating PUCCH resources for transmitting scheduling requests. The configuration message can be received from a network node, such as access node 104. The configuration message can comprise parameters including at least a PUCCH length and a periodicity. The periodicity can be smaller than the PUCCH length.

Step 420: Configure PUCCH resources of the wireless device in accordance with the configuration message.

Step 430: Transmit a scheduling request using the configured PUCCH resources.

It will be appreciated that one or more of the above steps can be performed simultaneously and/or in a different order. Also, steps illustrated in dashed lines are optional and can be omitted in some embodiments.

Figure 12:
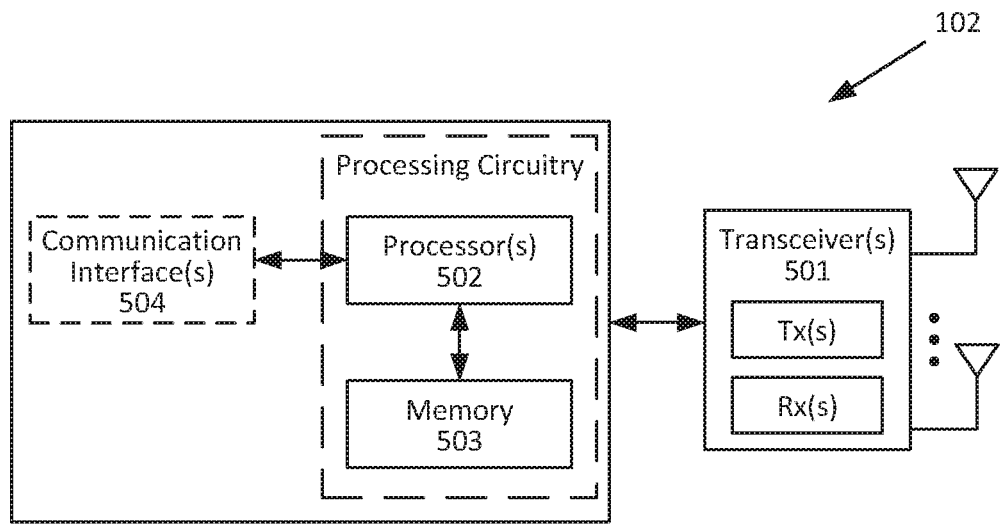
FIG. 12 is a block diagram of an example wireless device.

FIG. 12 is a block diagram of an example wireless device, such as UE 102, in accordance with certain embodiments. UE 102 can include a transceiver 501, processor 502, memory 503, and communication interface 504. In some embodiments, the transceiver 501 facilitates transmitting wireless signals to and receiving wireless signals from access node 104 (e.g., via transmitter(s) (Tx), receiver(s) (Rx) and antenna(s)). The processor 502 executes instructions to provide some or all of the functionalities described above as being provided by UE 102, and the memory 503 stores the instructions executed by the processor 502. In some embodiments, the processor 502 and the memory 503 form processing circuitry. The communication interface 504 can communicate signals to network components, such as a gateway, switch, router, Internet, Public Switched Telephone Network (PSTN), core network nodes or radio network controllers, etc.

The processor 502 may include any suitable combination of hardware to execute instructions and manipulate data to perform some or all of the described functions of UE 102, such as the functions of UE 102 described above. In some embodiments, the processor 502 may include, for example, one or more computers, one or more central processing units (CPUs), one or more microprocessors, one or more application specific integrated circuits (ASICs), one or more field programmable gate arrays (FPGAs) and/or other logic.

The memory 503 is generally operable to store instructions, such as a computer program, software, an application including one or more of logic, rules, algorithms, code, tables, etc. and/or other instructions capable of being executed by a processor. Examples of memory 703 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 502 of UE 102.

Other embodiments of UE 102 may include additional components beyond those shown in FIG. 12 that may be responsible for providing certain aspects of the UE's functionalities, including any of the functionalities described above and/or any additional functionalities (including any functionality necessary to support the solution described above). As just one example, UE 102 may include input devices and circuits, output devices, and one or more synchronization units or circuits, which may be part of the processor. Input devices include mechanisms for entry of data into UE 102. For example, input devices may include input mechanisms, such as a microphone, input elements, a display, etc. Output devices may include mechanisms for outputting data in audio, video and/or hard copy format. For example, output devices may include a speaker, a display, etc.

Figure 13:
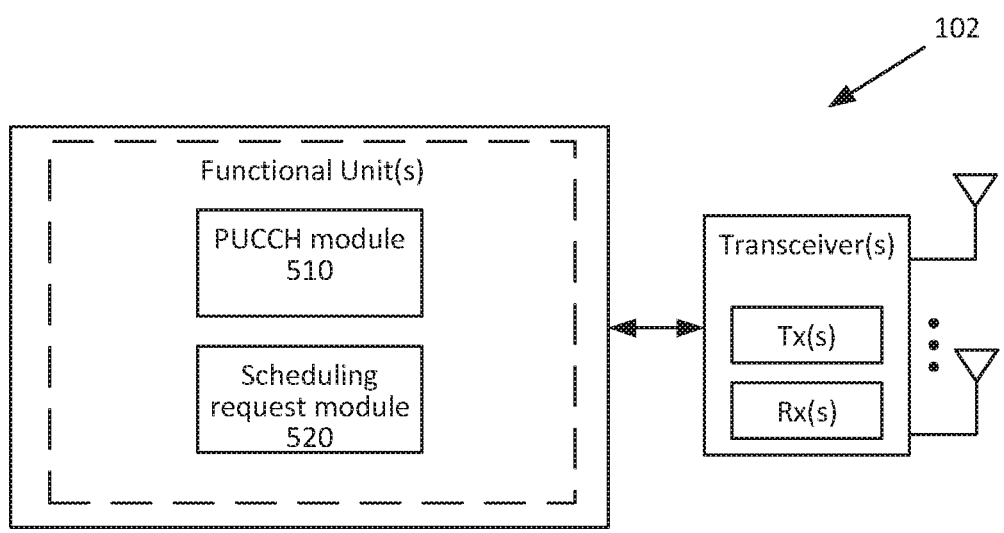
FIG. 13 is a block diagram of an example wireless device with modules.

In some embodiments, the UE 102 can comprise a series of functional units or modules configured to implement the functionalities of the UE described above. Referring to FIG. 13, in some embodiments, the UE 102 can comprise a PUCCH module 510 for configuring PUCCH resources and a scheduling request module 520 for transmitting a scheduling request message in accordance with the configured PUCCH resources.

It will be appreciated that the various modules may be implemented as combination of hardware and software, for instance, the processor, memory and transceiver(s) of UE 102 shown in FIG. 12. Some embodiments may also include additional modules to support additional and/or optional functionalities.

Figure 14:
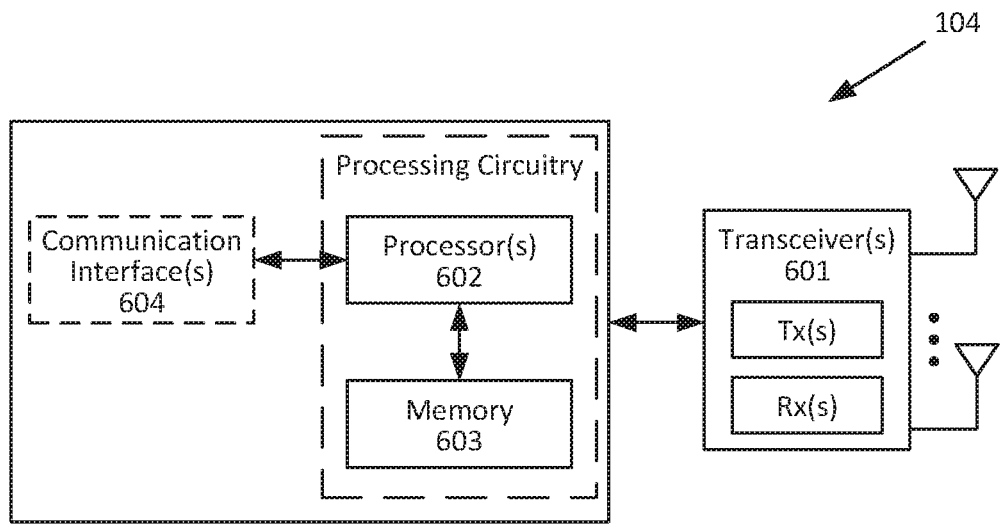
FIG. 14 is a block diagram of an example network node.

FIG. 14 is a block diagram of an exemplary network node 104, in accordance with certain embodiments. Network node 104 may include one or more of a transceiver 601, processor 602, memory 603, and communication interface 604. In some embodiments, the transceiver 601 facilitates transmitting wireless signals to and receiving wireless signals from UE 102 (e.g., via transmitter(s) (Tx), receiver(s) (Rx), and antenna(s)). The processor 602 executes instructions to provide some or all of the functionalities described above as being provided by a network node 104, the memory 603 stores the instructions executed by the processor 602. In some embodiments, the processor 602 and the memory 603 form processing circuitry. The network interface 604 communicates signals to backend network components, such as a gateway, switch, router, Internet, Public Switched Telephone Network (PSTN), core network nodes or radio network controllers, etc.

The processor 602 may include any suitable combination of hardware to execute instructions and manipulate data to perform some or all of the described functions of network node 104, such as those described above. In some embodiments, the processor 602 may include, for example, one or more computers, one or more central processing units (CPUs), one or more microprocessors, one or more application specific integrated circuits (ASICs), one or more field programmable gate arrays (FPGAs) and/or other logic.

The memory 603 is generally operable to store instructions, such as a computer program, software, an application including one or more of logic, rules, algorithms, code, tables, etc. and/or other instructions capable of being executed by a processor. Examples of memory 603 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 604 is communicatively coupled to the processor 602 and may refer to any suitable device operable to receive input for network node 104, send output from network node 104, perform suitable processing of the input or output or both, communicate to other devices, or any combination of the preceding. The communication interface 604 may include appropriate hardware (e.g., port, modem, network interface card, etc.) and software, including protocol conversion and data processing capabilities, to communicate through a network.

Other embodiments of network node 104 may include additional components beyond those shown in FIG. 9 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 15:
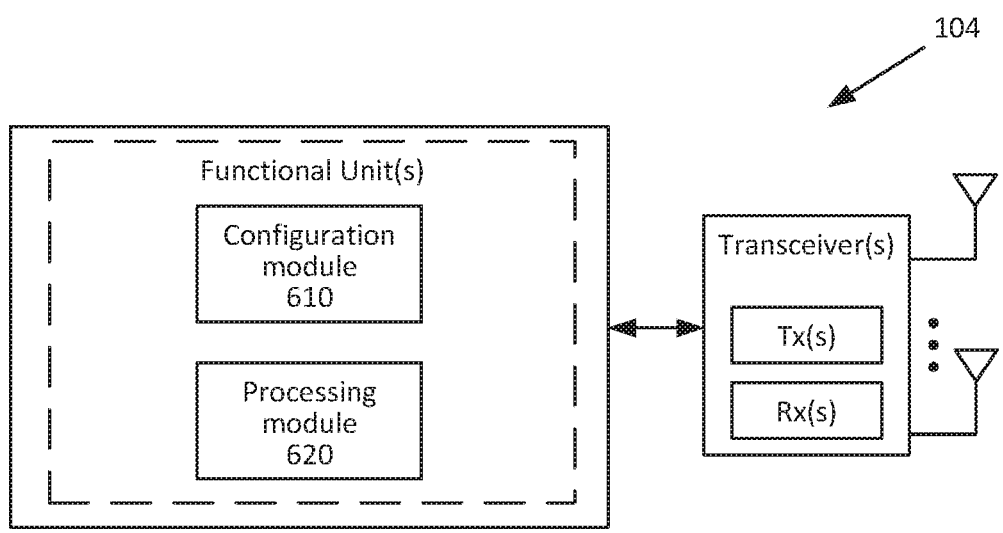
FIG. 15 is a block diagram of an example network node with modules.

In some embodiments, the network node 104, which can be, for example, an access node, may comprise a series of modules configured to implement the functionalities of the network node 104 described above. Referring to FIG. 15, in some embodiments, the network node can comprise a configuration module 610 for allocating and configuring PUCCH resources for at least one wireless device and a processing module 620 for processing scheduling request(s).

It will be appreciated that the various modules may be implemented as combination of hardware and software, for instance, the processor, memory and transceiver(s) of network node 104 shown in FIG. 14. Some embodiments may also include additional modules to support additional and/or optional functionalities.

Processors, interfaces, and memory similar to those described with respect to FIGS. 12 and 14 may be included in other network nodes (such as core network node 106). Other network nodes may optionally include or not include a wireless interface (such as the transceiver described in FIGS. 12 and 14).

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

GLOSSARY

The present description may comprise one or more of the following abbreviation:
1×RTT CDMA2000 1× Radio Transmission Technology
3GPP Third Generation Partnership Project
ABS Almost Blank Subframe
ACK Acknowledgement
ADC Analog-to-digital conversion
AGC Automatic gain control
ANR Automatic neighbor relations
AP Access point
ARQ Automatic Repeat Request AWGN Additive White Gaussian Noise band
BCCH Broadcast Control Channel
BCH Broadcast Channel
BLER Block error rate
BS Base Station
BSC Base station controller
BTS Base transceiver station
CA Carrier Aggregation
CC Component carrier
CCCH SDU Common Control Channel SDU
CDMA Code Division Multiplexing Access
CFI Control Format Indicator
CG Cell group
CGI Cell Global Identifier
CP Cyclic Prefix
CPICH Ec/No CPICH Received energy per chip divided by the power density in the
CPICH Common Pilot Channel
CQI Channel Quality information
C-RNTI Cell RNTI
CRS Cell-specific Reference Signal
CSG Closed subscriber group
CSI Channel State Information
DAS Distributed antenna system
DC Dual connectivity
DCCH Dedicated Control Channel
DCI Downlink Control Information
DFT Discrete Fourier Transform
DL Downlink
DL-SCH Downlink shared channel
DMRS Demodulation Reference Signal
DRX Discontinuous Reception
DTCH Dedicated Traffic Channel
DTX Discontinuous Transmission
DUT Device Under Test
EARFCN Evolved absolute radio frequency channel number
ECCE Enhanced Control Channel Element
ECGI Evolved CGI
E-CID Enhanced Cell-ID (positioning method)
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
FFT Fast Fourier transform
FS Frame structure
GERAN GSM EDGE Radio Access Network
GSM Global System for Mobile communication
HARQ Hybrid Automatic Repeat Request
HD-FDD Half duplex FDD
HO Handover
HRPD High Rate Packet Data
HSPA High Speed Packet Access
LCMS Level of Criticality of the Mobility State
LPP LTE Positioning Protocol
LTE Long-Term Evolution
M2M Machine to Machine
MAC Medium Access Control
MBMS Multimedia Broadcast Multicast Services
MBSFN ABS MBSFN Almost Blank Subframe
MB SFN Multimedia Broadcast multicast service Single Frequency Network
MCG Master cell group
MDT Minimization of Drive Tests
MeNB Master eNode B
MIB Master Information Block
MME Mobility Management Entity
MPDCCH MTC Physical Downlink Control Channel
MRTD Maximum Receive Timing Difference
MSC Mobile Switching Center
MSR Multi-standard Radio
MTC Machine Type Communication
NACK Negative acknowledgement
NDI Next Data Indicator
NPBCH Narrowband Physical Broadcast Channel
NPDCCH Narrowband Physical Downlink Control Channel
NR New Radio
O&M Operation and Maintenance
OCC Orthogonal Cover Code
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PLMN Public Land Mobile Network
PMI Precoder Matrix Indicator
PRACH Physical Random Access Channel
ProSe Proximity Service
PRS Positioning Reference Signal
PSC Primary serving cell
PSCell Primary SCell
PSS Primary Synchronization Signal
PSSS Primary Sidelink Synchronization Signal
PUCCH Physical Uplink Control Channel
PUSCH Physical Uplink Shared Channel
QAM Quadrature Amplitude Modulation
RACH Random Access Channel
RAT Radio Access Technology
RB Resource Block
RF Radio Frequency
RLM Radio Link Management
RNC Radio Network Controller
RNTI Radio Network Temporary Identifier
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SC Single Carrier
SCC Secondary Component Carrier
SCell Secondary Cell
SCG Secondary Cell Group
SCH Synchronization Channel SDU Service Data Unit
SeNB Secondary eNodeB
SF Subframe
SFN System Frame Number
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
SSS Secondary synchronization signal
SSSS Secondary Sidelink Synchronization Signal
TA Timing Advance
TAG Timing Advance Group
TDD Time Division Duplex
TDM Time Division Multiplexing
TTI Transmission Time Interval
Tx Transmitter
UARFCN UMTS Absolute Radio Frequency Channel Number
UE User Equipment
UL Uplink
UMTS Universal Mobile Telecommunication System
URLLC Ultra-Reliable Low Latency Communication
UTRA Universal Terrestrial Radio Access
UTRAN Universal Terrestrial Radio Access Network
V2I Vehicle-to-Infrastructure
V2P Vehicle-to-Pedestrian
V2X Vehicle-to-X
WCDMA Wide CDMA
WLAN Wireless Local Area Network

The invention claimed is:

1. A method for scheduling request resource allocation, performed by a network node, the method comprising:
   allocating Physical Uplink Control Channel (PUCCH) resources to at least one wireless device for uplink transmissions;
   transmitting, to a first wireless device, a configuration message indicating a periodic PUCCH resource for transmitting one or more scheduling requests, the configuration message including a PUCCH length and a scheduling request periodicity, wherein the scheduling request periodicity is smaller than the PUCCH length such that the first wireless device is allocated overlapping PUCCH resources for transmitting the scheduling requests; and
   receiving, from the first wireless device, a first scheduling request.

2. The method of claim 1, wherein the PUCCH length indicates a number of symbols to be used for transmitting scheduling requests.

3. The method of claim 1, wherein the PUCCH length is a long PUCCH format of four or more symbols.

4. The method of claim 3, wherein the scheduling request periodicity is less than or equal to three symbols.

5. The method of claim 1, wherein the configuration message further includes at least one frequency resource for transmitting scheduling requests.

6. The method of claim 5, wherein the configuration message further includes frequency shifting information.

7. The method of claim 1, wherein the configuration message further includes a starting scheduling request defining a time that a PUCCH transmission can be initiated.

8. The method of claim 1, further comprising, transmitting a second configuration message to a second wireless device.

9. The method of claim 1, further comprising, receiving a second scheduling request from a second wireless device, wherein the first and second scheduling requests are overlapping in at least one of time and frequency resources.

10. A network node comprising circuitry including a processor and a memory, the memory containing instructions executable by the processor whereby the network node is operative to:
    allocate Physical Uplink Control Channel (PUCCH) resources to at least one wireless device for uplink transmissions;
    transmit, to a first wireless device, a configuration message indicating a periodic PUCCH resource for transmitting one or more scheduling requests, the configuration message including a PUCCH length and a scheduling request periodicity, wherein the scheduling request periodicity is smaller than the PUCCH length such that the first wireless device is allocated overlapping PUCCH resources for transmitting the scheduling requests; and
    receive, from the first wireless device, a first scheduling request.

11. The network node of claim 10, wherein the PUCCH length indicates a number of symbols to be used for transmitting scheduling requests.

12. The network node of claim 10, wherein the PUCCH length is a long PUCCH format of four or more symbols.

13. The network node of claim 12, wherein the scheduling request periodicity is less than or equal to three symbols.

14. The network node of claim 10, wherein the configuration message further includes at least one frequency resource for transmitting scheduling requests.

15. The network node of claim 14, wherein the configuration message further includes frequency shifting information.

16. The network node of claim 10, wherein the configuration message further includes a starting scheduling request defining a time that a PUCCH transmission can be initiated.

17. The network node of claim 10, further operative to transmit a second configuration message to a second wireless device.

18. The network node of claim 10, further operative to receive a second scheduling request from a second wireless device, wherein the first and second scheduling requests are overlapping in at least one of time and frequency resources.

19. A method for scheduling request resource configuration, performed by a wireless device, the method comprising:
    receiving a configuration message indicating a periodic Physical Uplink Control Channel (PUCCH) resource for transmitting one or more scheduling requests, the configuration message including a PUCCH length and a scheduling request periodicity, wherein the scheduling request periodicity is smaller than the PUCCH length such that the wireless device is allocated overlapping PUCCH resources for transmitting the scheduling requests; and
    transmitting a first scheduling request in accordance with the received configuration message.

20. The method of claim 19, wherein the PUCCH length indicates a number of symbols to be used for transmitting scheduling requests.

21. The method of claim 19, wherein the configuration message further including at least one frequency resource for transmitting scheduling requests.

22. The method of claim 21, wherein the configuration message further includes frequency shifting information.

23. The method of claim 19, wherein the configuration message further includes a starting scheduling request defining a time that a PUCCH transmission can be initiated.

24. A wireless device comprising circuitry including a processor and a memory, the memory containing instructions executable by the processor whereby the wireless device is operative to:
   receive a configuration message indicating a periodic Physical Uplink Control Channel (PUCCH) resource for transmitting one or more scheduling requests, the configuration message including a PUCCH length and a scheduling request periodicity, wherein the scheduling request periodicity is smaller than the PUCCH length such that the wireless device is allocated overlapping PUCCH resources for transmitting the scheduling requests; and
   transmit a scheduling request in accordance with the received configuration message.

25. The wireless device of claim 24, wherein the PUCCH length indicates a number of symbols to be used for transmitting scheduling requests.

26. The wireless device of claim 24, wherein the configuration message further including at least one frequency resource for transmitting scheduling requests.

27. The wireless device of claim 26, wherein the configuration message further includes frequency shifting information.

28. The wireless device of claim 24, wherein the configuration message further includes a starting scheduling request defining a time that a PUCCH transmission can be initiated.

* * * * *

UNITED STATES PATENT AND TRADEMARK OFFICE
CERTIFICATE OF CORRECTION

| | | |
|---|---|---|
| PATENT NO. | : 12,052,714 B2 | Page 1 of 2 |
| APPLICATION NO. | : 16/621970 | |
| DATED | : July 30, 2024 | |
| INVENTOR(S) | : Zou et al. | |

It is certified that error appears in the above-identified patent and that said Letters Patent is hereby corrected as shown below:

On the Title Page

On Page 2, item (56), under "OTHER PUBLICATIONS", in Column 2, Line 8, delete "al.,"SR" and insert -- al., "SR --, therefor.

In the Specification

In Column 2, Line 37, delete "Demodulated" and insert -- Demodulation --, therefor.

In Column 4, Line 5, delete "cane" and insert -- can --, therefor.

In Column 5, Line 33, delete "equipped" and insert -- equipment --, therefor.

In Column 6, Line 45, delete "directly" and insert -- direct --, therefor.

In Column 7, Line 10, delete "SR periodicity" and insert -- SR-periodicity --, therefor.

In Column 7, Line 50, delete "SR periodicity," and insert -- SR-periodicity, --, therefor.

In Column 10, Line 48, delete "and/or or" and insert -- and/or --, therefor.

In Column 11, Line 50, delete "and/or or" and insert -- and/or --, therefor.

In Column 13, Line 1, delete "Noise band" and insert -- Noise --, therefor.

In Column 13, Line 11, delete "Code Division Multiplexing Access" and insert -- Code-Division Multiple Access --, therefor.

In Column 13, Line 14, delete "Cell Global Identifier" and insert -- Cell Global Identity --, therefor.

Signed and Sealed this
Seventh Day of October, 2025

John A. Squires
*Director of the United States Patent and Trademark Office*

CERTIFICATE OF CORRECTION (continued)
U.S. Pat. No. 12,052,714 B2

In Column 13, Line 19, delete "information" and insert -- Indicator --, therefor.

In Column 13, Line 65, delete "MB SFN" and insert -- MBSFN --, therefor.

In Column 14, Line 34, delete "indication" and insert -- indicator --, therefor.

In Column 14, Line 36, delete "Precoder Matrix Indicator" and insert -- Precoding Matrix Indicator --, therefor.

In Column 14, Line 51, delete "Radio Link Management" and insert -- Radio Link Monitoring --, therefor.

In Column 15, Line 9, delete "Signal Noise Ratio" and insert -- Signal-to-Noise Ratio --, therefor.

In Column 15, Line 33, delete "Vehicle-to-X" and insert -- Vehicle-to-Everything --, therefor.

In Column 15, Line 34, delete "Wide CDMA" and insert -- Wideband CDMA --, therefor.